March 11, 1958     W. H. RANDALL     2,826,346
SERVING HOLDER

Filed May 3, 1954                                     9 Sheets-Sheet 1

INVENTOR.
WALTER H. RANDALL
BY
HIS ATTORNEYS

March 11, 1958     W. H. RANDALL     2,826,346
SERVING HOLDER

Filed May 3, 1954                                  9 Sheets-Sheet 2

*INVENTOR.*
WALTER H. RANDALL
BY
HIS ATTORNEYS

March 11, 1958 — W. H. RANDALL — 2,826,346
SERVING HOLDER
Filed May 3, 1954 — 9 Sheets-Sheet 3

INVENTOR.
WALTER H. RANDALL
BY
HIS ATTORNEYS

March 11, 1958  W. H. RANDALL  2,826,346
SERVING HOLDER

Filed May 3, 1954  9 Sheets-Sheet 4

INVENTOR.
WALTER H. RANDALL
BY
HIS ATTORNEYS

March 11, 1958 — W. H. RANDALL — 2,826,346
SERVING HOLDER

Filed May 3, 1954 — 9 Sheets-Sheet 5

INVENTOR.
WALTER H. RANDALL
BY
HIS ATTORNEYS

INVENTOR.
WALTER H. RANDALL
BY
HIS ATTORNEYS

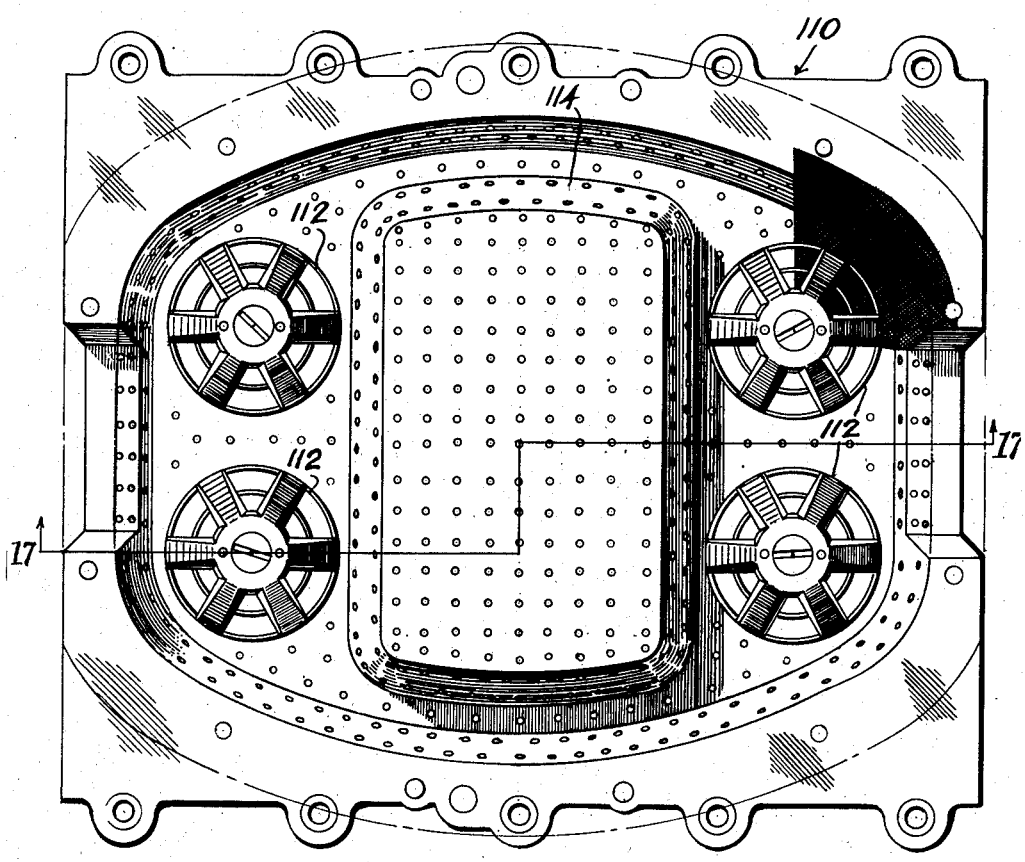
Fig. 16
Fig. 17
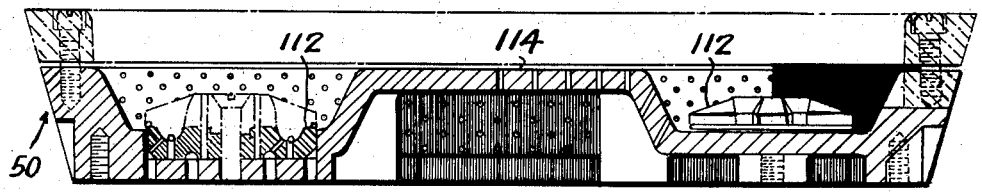

March 11, 1958     W. H. RANDALL     2,826,346
SERVING HOLDER

Filed May 3, 1954     9 Sheets-Sheet 8

INVENTOR.
WALTER H. RANDALL
BY
HIS ATTORNEYS

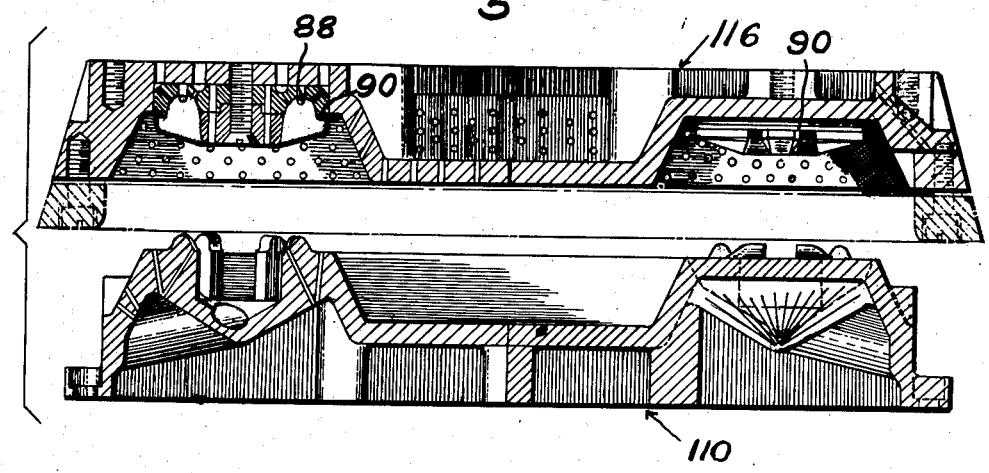

United States Patent Office 2,826,346
Patented Mar. 11, 1958

2,826,346

SERVING HOLDER

Walter H. Randall, Waterville, Maine, assignor to Keyes Fibre Company, Portland, Maine, a corporation of Maine Application May 3, 1954, Serial No. 427,208

2 Claims. (Cl. 224—48)

This invention relates to article carriers or tray-like holders for serving foods and particularly relates to such holders constructed of cellulosic material such as molded wood pulp, wherein openings are provided to interchangably hold various types and sizes of food articles without any structural modifications of the holders being necessary. This application is a continuation-in-part of patent application, Ser. No. 334,031, filed January 29, 1953, issued as Patent No. 2,766,919, dated October 16, 1956.

The serving holder of the present invention is particularly suited for use in curb service restaurants where ice-cream cones and soft drinks as well as cakes, cookies, sandwiches or the like are being served. It can be used to serve any of the above foods either simultaneously or individually. The restaurant, therefore, does not have the bother and expense of puchasing and storing different types of trays for use with different types of foods. These holders, furthermore, can be easily held with one hand and used as individual platters for each customer, thereby reducing the need for tables. Furthermore, the inherent inexpensive construction of these holders makes them suitable for throw-away after a single use; they are also difficult to break so that they are ideal for picnics, parties and the like. They are furthermore so constructed that a plurality of them may be nested one within the other for easy packaging and storage, thereby cutting shipping costs.

It is, therefore, one object of this invention to provide a food holding device capable of securely supporting a variety of food articles of different sizes.

Another object of this invention is to provide a food holding device which is adapted to hold differently shaped and sized articles in the same holding means without the necessity of any structural modifications of the device.

Another object of this invention is to provide a food holding device which is low in cost and which is easily produced.

Another object of this invention is to provide a food holding device which is constructed so that it may be easily nested within other devices of the same type.

Other objects and many of the attendant advantages of this invention will be readily appreciated as the same becomes better understood by reference to the following detailed description when considered in connection with the accompanying drawings wherein.

Figure 1:
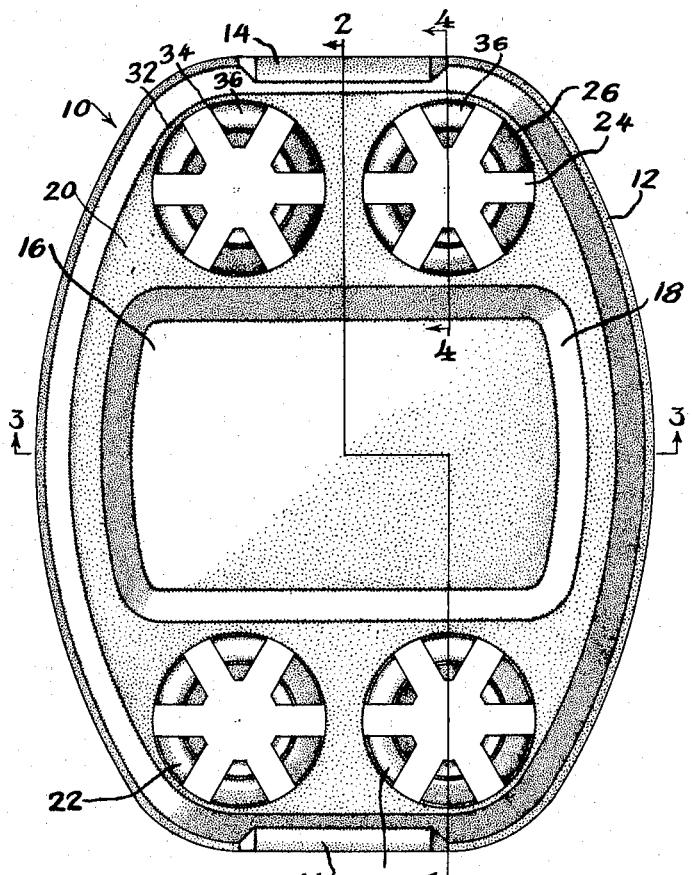
Fig. 1 is a top plan view of a tray embodying this invention.
Figure 2:
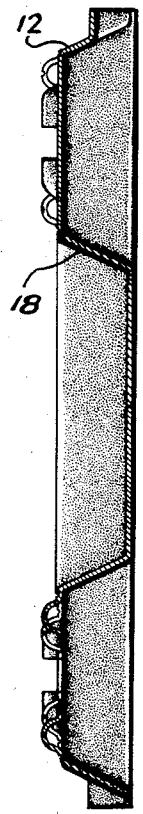
Fig. 2 is a sectional view taken on line 2—2 of Fig. 1.
Figure 3:
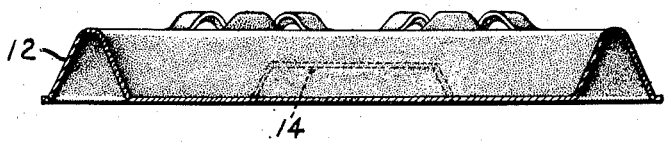
Fig. 3 is a cross-sectional view taken on line 3—3 of Fig. 1.
Figure 4:
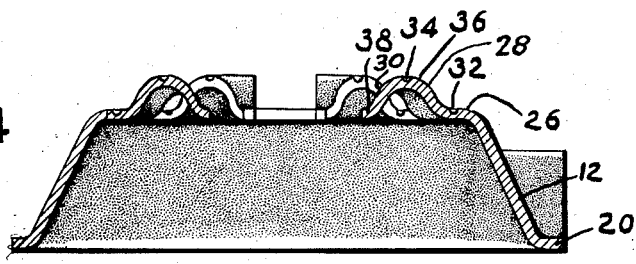
Figure 5:
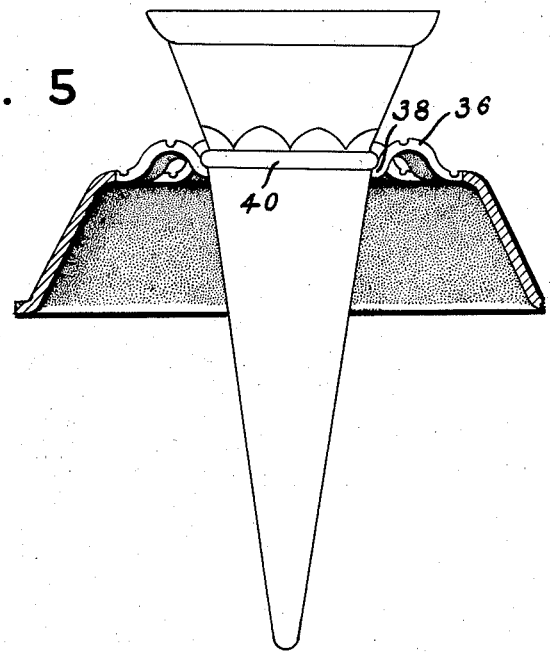
Figure 6:
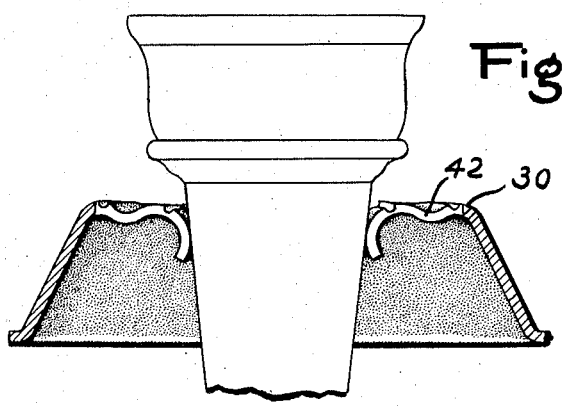
Figure 7:
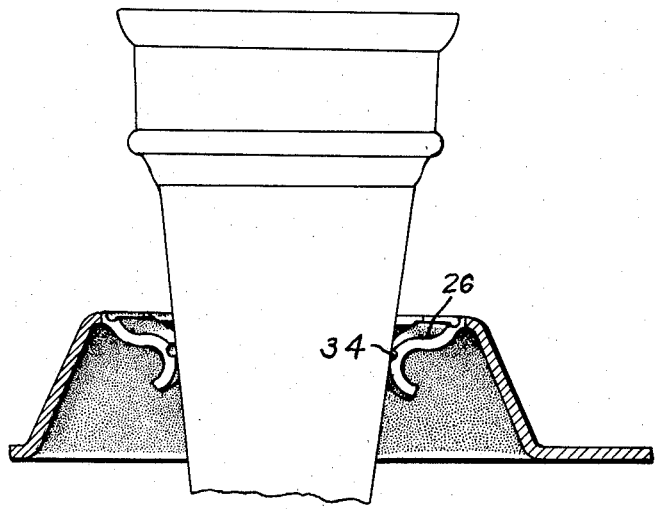
Figure 8:
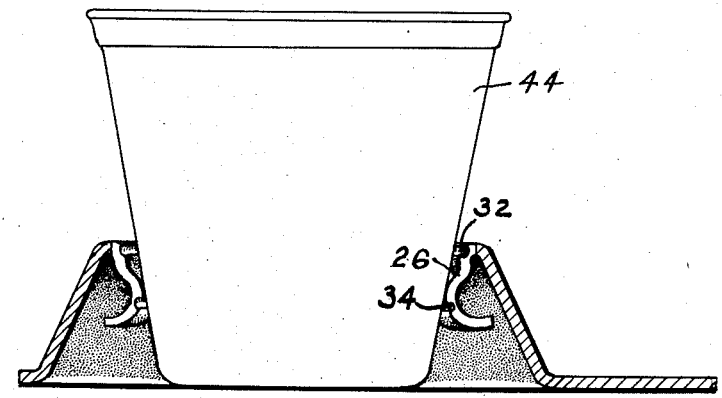
Figure 9:
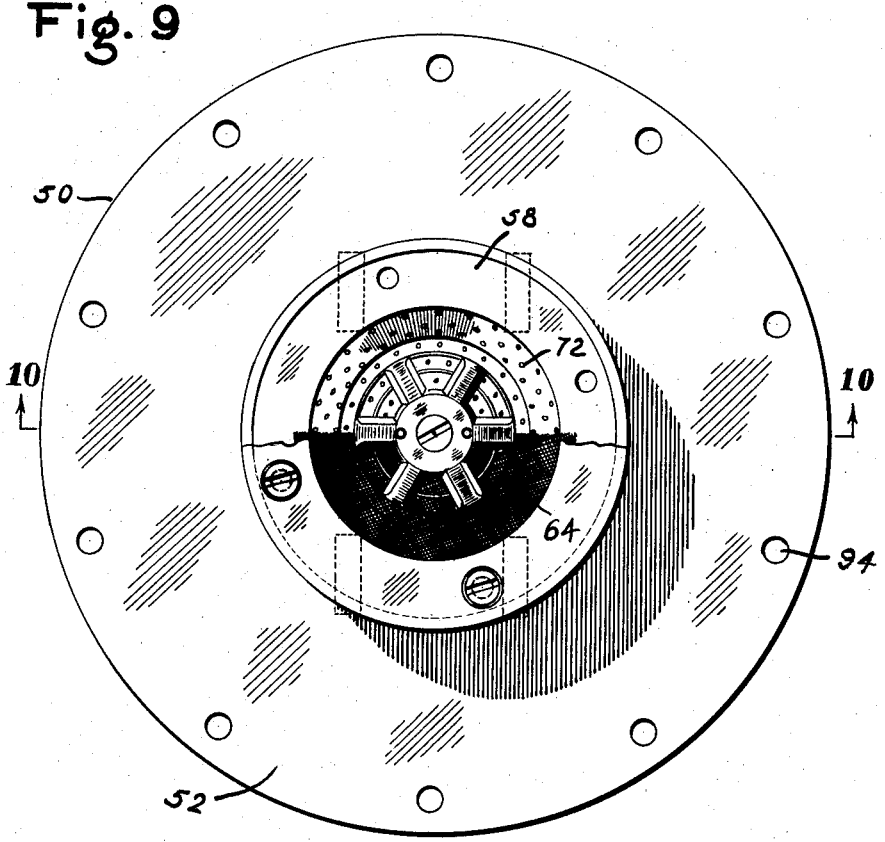
Figure 10:
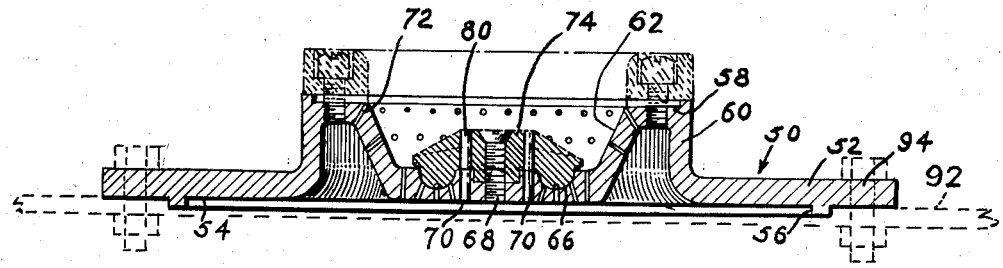
Figure 11:
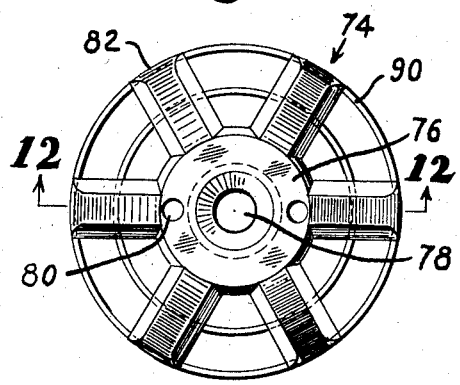
Figure 12:
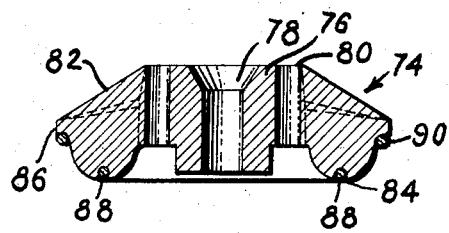
Figure 13:
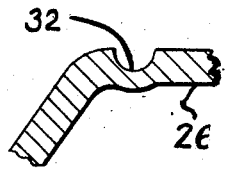
Figure 14:
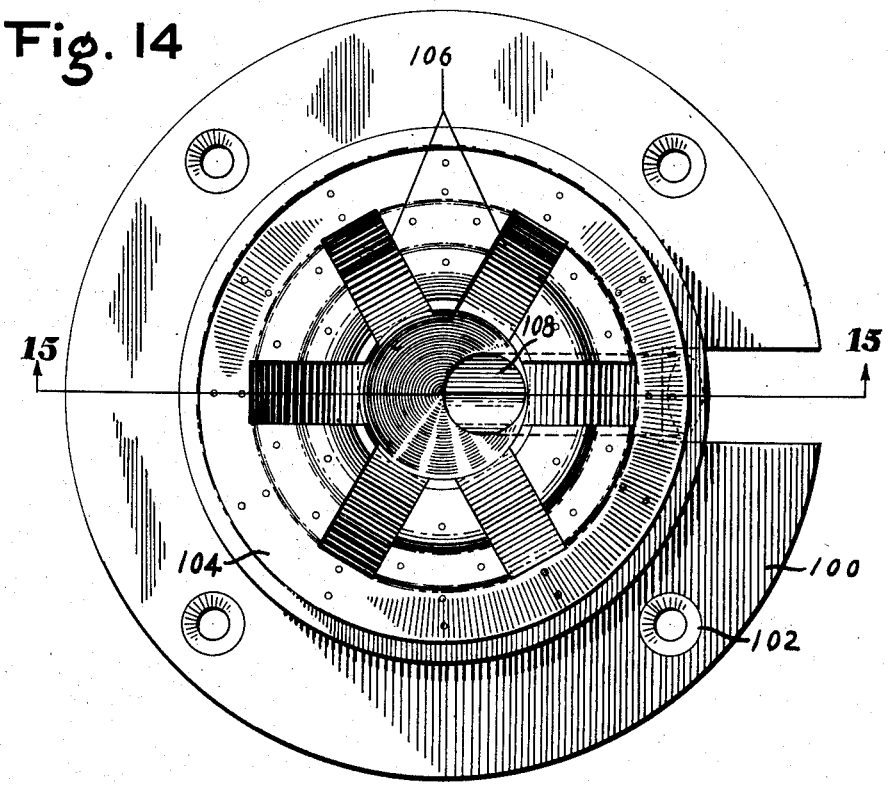
Figure 15:
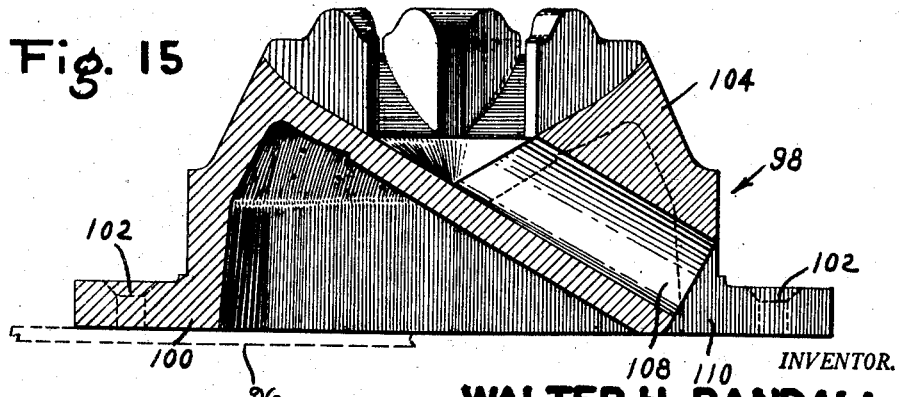
Figure 18:
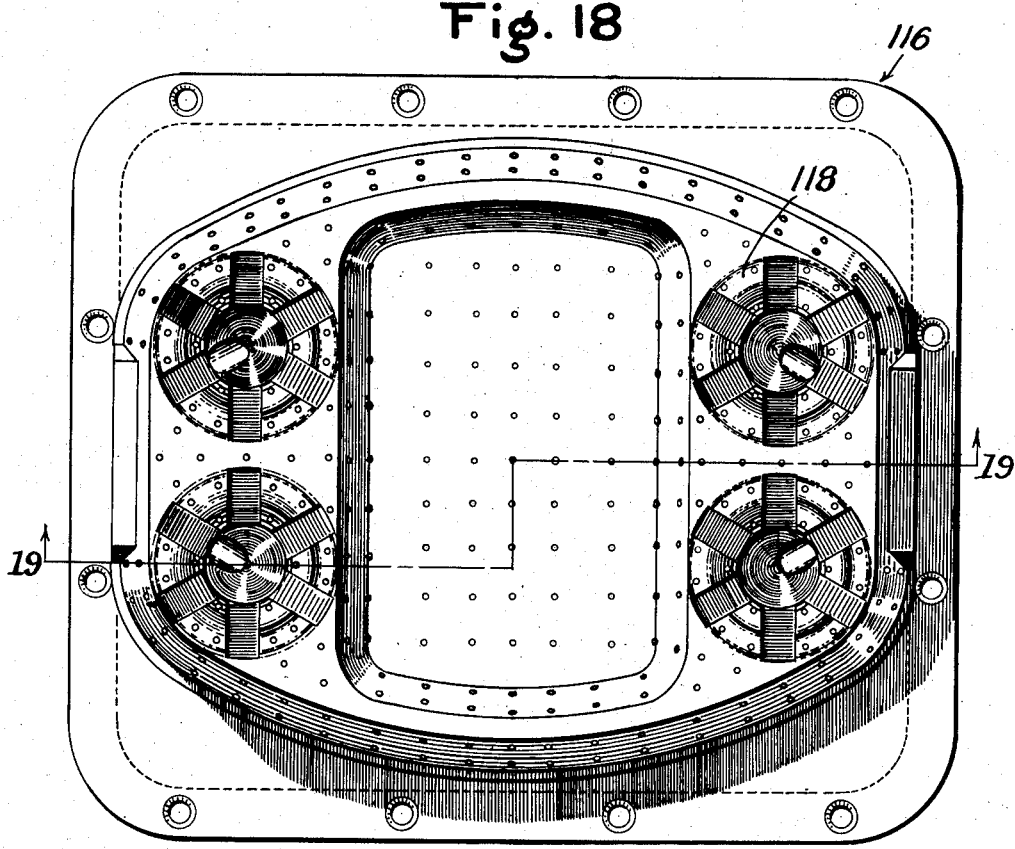
Figure 19:
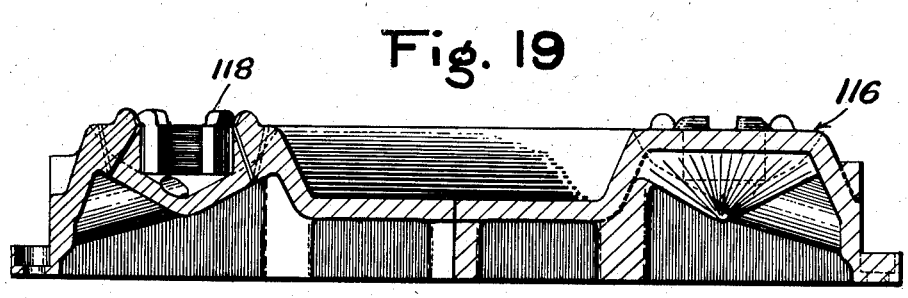

Fig. 4 is a sectional view of one of the article holding openings taken on line 4—4 of Fig. 1, Fig. 5 is a sectional view similar to Fig. 4 but with an ice-cream cone shown held in place, Fig. 6 is a sectional view similar to Figs. 4 and 5 but showing a cone of different configuration being held in place, Fig. 7 is a sectional view similar to Figs. 4, 5, and 6 but showing yet another type of cone being held, Fig. 8 is a sectional view similar to Fig. 1, but showing a cup being held in place, Fig. 9 is a top plan view of the base portion of one of the forming die sections, Fig. 10 is a view taken on line 10—10 of Fig. 9, Fig. 11 is a top plan view of the center insert for the base portion shown in Fig. 9, Fig. 12 is a view taken on line 12—12 of Fig. 11, Fig. 13 is a cross-sectional view of the groove formed in the article before it is pressed by the upper die plate, Fig. 14 is a top plan view of a pressing die used in conjunction with the forming die, Fig. 15 is a view taken on line 15—15 of Fig. 14, Fig. 16 is a top plan view of the complete forming die, Fig. 17 is a cross-sectional view taken on line 17—17 of Fig. 16, Fig. 18 is a top plan view of the complete pressing die used in conjunction with the forming die of Fig. 16, Fig. 19 is a cross-sectional view taken on line 19—19 of Fig. 18 and Fig. 20 shows a cross-sectional view of the complete forming and pressing die in operative position.

Referring now in greater detail to the drawings wherein similar reference characters refer to similar parts there is shown a tray, generally designated 10 which is formed of molded pulp. As illustrated, the tray is shown to be substantially flat and generally rectangular in plan view with rounded corners and is provided with an angularly disposed depending marginal wall flange on the periphery thereof as at 12. This flange 12 is in the form of a channel member which is interrupted at either end of the tray by an indentation 14 which is constructed to provide a hand grip.

Centrally positioned on the tray is a generally rectangular depression 16 bounded by angularly disposed depending wall portions 18. Surrounding the depression 16 is a plateau-like portion 20 in which are provided a plurality of holding means 22. Each of these holding means 22 comprises a generally circular opening 24 on the peripheral wall of which are provided a plurality of fingers or flanges 26 extending radially inwardly toward the center of the opening, there being six such fingers or flanges illustrated here.

Each of these flanges 26 comprises an upwardly inclined portion 28 and a downwardly inclined portion 30 which combine to form a hollow rib 36. Adjacent one side of each of the ribs 36 is provided a groove 32 while at the apex of the rib is formed a groove 34. These grooves 32 and 34 provide lines of weakness upon which the flange is adapted to be bent or folded. The ribs 36 provide a strengthening means for the flange portion between the grooves and also add to the inherent resilience of the flange.

The various uses of the holding means 22 are illustrated in Figs. 5 to 8. In Fig. 5, it is shown holding an ice-cream cone with the radially inner marginal edges 38 of the flanges engaging under the rib 40 of the cone and with the ribs 36 acting as resilient supporting means. Figs. 6, 7, and 8 show the holding means used with various sizes of cones. The cone bends the fingers down in accordance with the size of the cone as it is inserted with the grooves forming lines of weakness to permit easy bending of the fingers as the cone is inserted. In Fig. 6, only the portion at the inner side of groove 34 is bent. In Figs. 7 and 8, the cones are of such size that they bend the fingers downwardly at the groove 32, the amount of bending varying with the size of the cone. In all cases, however, the fingers still firmly hold the cone in position.

It is, therefore, apparent that the tray can be used to hold cookies, cakes, sandwiches and the like in the central depressed area 16, while each of the holders 22 may be used to alternatively hold various shapes and sizes of ice-cream cones, cups or glasses, or any one of a variety of other foods or food containers. The marginal rib formation of the tray embodied in the rib 12 also permits these trays to be nested within each other for storage or shipping purposes.

The apparatus for forming the tray 10 is illustrated in Figs. 9 to 20. These forming and pressing dies are adapted to be used in conjunction with pulp molding apparatus such as illustrated in U. S. patent, Serial No. 2,163,585, dated June 27, 1939. In general, the pulp is drawn against a wire screen which covers the face of the forming die by a suction device. The suction pulls the water through the screen and the openings formed in the die and causes the fibres to build up on the die face. The forming die is then brought into contact with the pressing die which molds the caked material into the desired form.

The forming die for the holders 22 comprises a base plate 50 illustrated in Figs. 9 and 10. The base plate 50 consists of a circular, flat plate 52 having an underlying circular groove 54 bounded by a depending circular flange 56. An upstanding, circular flange 58 is formed centrally of the upper surface of the plate, this flange having a generally straight wall at 60 and an inclined wall at 62. Connected to the flange 58, as by bolts or the like, is a wire screen 64.

Within the space surrounded by the flange 58 is provided a circular groove 66, this groove being positioned in surrounding relationship to a central screw hole 68. A pair of drilled holes 70, are provided at opposite sides of the hole 68. The entire die is perforated, as indicated at 72, to allow water to pass therethrough.

A center insert, corresponding to the desired shape of the finished article, is adapted to be connected to base plate 50. This insert, designated 74, is shown in Fig. 10 and is more clearly illustrated in Figs. 11 and 12. The insert 74 comprises a center body portion 76 having a drilled hole 78 in the center thereof and a drilled hole 80 at either side of the hole 78. Six arms 82 radiate outwardly from the central portion, these arms having a generally curved under-side with a groove 84 formed at the apex thereof and a shoulder 86 at the ends. A wire ring 88 is positioned in the grooves 84 and soldered in place and a wire ring 90 is soldered in place on the shouldered edges 86. The insert is connected to the base plate 50 over the screen, which is not shown in Fig. 10, by means of a machine screw passing through the mating holes 68 and 78 and dowel pins or the like projecting through holes 70 and 80. The curved under-sides of the arms 82 are positioned within the groove 66 whereby spaces are formed in the groove 66 between the arms conforming in outline to the fingers 26 of the finished tray. The rings 88 and 90 pass through these spaces and, during the molding process, they act to form the grooves 32 and 34 in the fingers.

The assembled forming die is then connected to the main forming die plate 92 by means of inserting screws, bolts, rivets or the like through openings 94 on the periphery of the plate 50, which are adapted to mate with similar openings on the main plate. The main plate may desirably have a shoulder or the like to seat against the rib 56 for positioning purposes.

The main pressing die plate 96 comprises a plate complementary to plate 92, this main pressing die plate being provided with dies 98 complementary to the forming dies. Each of the dies 98 comprises a base plate 100 having peripheral openings 102 to receive connecting screws or the like for connecting the die to the plate 96. A central embossment 104 is integrally connected with the plate and is provided with six evenly spaced slots or grooves 106 complementary to arms 82. A diagonal bore 108 extends through the embossment, this bore being adapted to be connected to atmosphere.

Figs. 16 and 17 show a complete forming die 110 including the dies for the article holders and for the central recess. This forming die 110 is similar to die 92 to which the member 50 is removably attached except that in the case of die 110 the die members 112 similar to members 50, are formed integral with the die plate. Also integral with the die plate is the central recess forming member 114.

Figs. 18 and 19 show a complete pressing die 116 complementary to die 110. In this case, too, the die members 118 are integral with the plate instead of removable therefrom as in Figs. 14 and 15. In Fig. 20 the operative relationship between the die forming device 110 and the die pressing device 116 is illustrated.

The operation of the forming apparatus is substantially similar to the operation described in the above mentioned patent Serial No. 2,163,585, and it is, therefore, not considered necessary to describe it here, except to point out that the use of the wires 88 and 90 to form the grooves in the completed article involve a novel and exceedingly efficient means for accomplishing this purpose. It should here be noted that the wires are constructed of such a diameter that they are less than the thickness of the wall of the finished article. In fact their diameter is preferably about one-half the thickness of the wall of the article.

Another fact to be brought out here concerns the provision of the undulating or ribbed fingers 26 with the grooved lines of weakness at either side of the ribs. This grooved and ribbed structure is a great improvement over the use of straight, ungrooved fingers insofar as concerns the strength and resiliency of the fingers and also their adaptability to various uses and to various sizes and shapes of food articles to be held.

Obviously, many modifications and variations of the present invention are possible in the light of the above teachings. It is, therefore, to be understood that within the scope of the appended claims the invention may be practiced otherwise than as specifically described.

What is claimed in this invention is:

1. A molded pulp tray comprising a relatively flat plate having a recess in the generally central area thereof, and a plurality of food article holding means on opposite sides of said recess, each of said holding means comprising an opening in said tray and a plurality of spaced fingers extending radially inwardly relative to said opening from the peripheral wall defining said opening, each of said fingers having a cross-sectionally upwardly convexly curved portion, and a plurality of radially spaced, continuous, molded grooves extending annularly across each of said fingers, one of said grooves being at the juncture of said fingers with said peripheral wall.

2. A molded-pulp article holding means comprising a base, an opening in said base, a plurality of fingers on said base, said fingers extending inwardly from the periphery of said opening, each of said fingers being spaced from the adjoining fingers and having at least one upwardly convexly curved rib thereon, each of said fingers being further provided with a plurality of spaced, continuous, molded grooves, one of said grooves being at the juncture of the finger and said periphery.

References Cited in the file of this patent
UNITED STATES PATENTS

| | | |
|---|---|---|
| 1,239,661 | Armstrong | Sept. 11, 1917 |
| 1,506,515 | Cormie | Aug. 26, 1924 |
| 1,952,168 | Hawley | Mar. 27, 1934 |
| 2,038,721 | Desmond | Apr. 28, 1936 |
| 2,195,442 | Barney | Apr. 2, 1940 |
| 2,244,486 | Chaplin | June 3, 1941 |

(Other references on following page)

| | UNITED STATES PATENTS | | |
|---|---|---|---|
| 2,298,980 | Sloan et al. | Oct. 13, | 1942 |
| 2,314,935 | Gutterman | Mar. 30, | 1943 |
| 2,346,608 | Randall | Apr. 11, | 1944 |
| 2,471,932 | Chaplin | May 31, | 1949 |
| 2,601,815 | De Reamer | July 1, | 1952 |
| 2,655,303 | Cox | Oct. 13, | 1953 |
| 2,766,919 | Randall | Oct. 16, | 1956 |

FOREIGN PATENTS

| 391,696 | Great Britain | May 4, 1933 |